United States Patent [19]

Ezekoye

[11] Patent Number: 4,909,982

[45] Date of Patent: Mar. 20, 1990

[54] APPARATUS FOR SEPARATING AND VENTING GAS ENTRAINED IN A LIQUID FLOW STREAM

[75] Inventor: L. Ike Ezekoye, Pittsburgh, Pa.

[73] Assignee: Westinghouse Electric Corp., Pittsburgh, Pa.

[21] Appl. No.: 295,701

[22] Filed: Jan. 11, 1989

[51] Int. Cl.$^4$ .............................................. G21C 19/00
[52] U.S. Cl. .................................. 376/310; 137/487.5; 55/309
[58] Field of Search ....................... 376/283, 310, 316; 55/309; 137/487.5, 508

[56] References Cited

U.S. PATENT DOCUMENTS 3,114,414  12/1963  Judd ..................................... 376/307
3,859,166   1/1975  Flynn et al. ......................... 376/283

Primary Examiner—Daniel Wasil
Attorney, Agent, or Firm—Michael G. Panian

[57] ABSTRACT

A gas/liquid separating and vent apparatus wherein gas trapped and/or entrained in a standpipe containing liquid medium is separated from the liquid and vented off. The valve can be power or manually operated. In both modes, the separator distinguishes between gas and liquid because of the differences in compressibility of the fluids. The venting of liquid is prevented if no significant amount of gas is present in the system.

21 Claims, 3 Drawing Sheets

APPARATUS FOR SEPARATING AND VENTING GAS ENTRAINED IN A LIQUID FLOW STREAM

TECHNICAL FIELD

The invention relates to equipment associated with fluid piping systems, and more particularly to an apparatus for separating and venting gas entrained in a liquid flow stream.

BACKGROUND OF THE INVENTION

In piping systems for a liquid flow stream, it is not uncommon for air or gas bubbles to be formed and become entrained in the flow stream. This is at least partially due to the fact that most piping systems include numerous bends and connections from other systems along the length of the piping. Normally, such a condition may not pose a significant problem. However, when the liquid must be pumped at a significantly increased pressure, as well as other systems where the presence of gas bubbles in the flow stream is undesirable, such gas bubbles can pose a threat to associated equipment.

When a liquid is pumped, it is important that the likelihood of the presence of gas bubbles is kept at a minimum for several reasons. Among them, one of the most important is that the gas bubbles are easily compressed when placed under increased pressure. This in turn may cause the pressure of the liquid to be less than that which it is desired to be, since the compression of the gas bubbles will mean less force is imparted to the liquid. Moreover, uneven suction by the pump inlet or surge line can cause vibration of the system, as well the internal parts of the pumps. Excessive vibration of the piping, and especially the pump itself, can cause damage to the system.

In the event that a pump or a pipe should fail, the entire system must be shut down in order for the damaged equipment to be repaired or replaced. An unscheduled maintenance outage in any type of piping system is therefore quite time consuming and costly. Consequently, it is highly desirable to provide means which will prevent excessive gas bubbles from becoming entrained in a liquid flow stream. Or, if such gas formation is unavoidable, the removal of that gas prior to the liquid flow stream entering any critical stage or component is also desired.

DISCLOSURE OF THE INVENTION

It is therefore an object of the present invention to provide an apparatus which will remove and vent gas bubbles entrained within a liquid flow stream.

It is another object of the present invention to provide such a device which will prevent the inadvertent venting of liquid if no significant amount of gas is present in the flow stream.

It is a further object of the present invention to provide a device which is controllable for different operating conditions in a particular flow stream.

The above objects are attained by the present invention, according to which, briefly stated, a valve for separating and venting gas entrained in a liquid flow stream is provided. The separator apparatus comprises a housing defining a separator chamber therein, an inlet for admitting the liquid flow stream into the separator chamber, and means for changing the volume of the separator chamber. A gas outlet in fluid communication with the separator chamber is provided for venting the gas separated from the liquid flow stream. Additionally, means for venting only gas from the liquid flow stream through the gas outlet is included.

BRIEF DESCRIPTION OF THE DRAWINGS

Various other objects, features, and advantages of the invention will become more apparent by reading the following detailed description in conjunction with the drawings, which are shown by way of example only, wherein.

DESCRIPTION OF THE PREFERRED EMBODIMENTS

Figure 1:
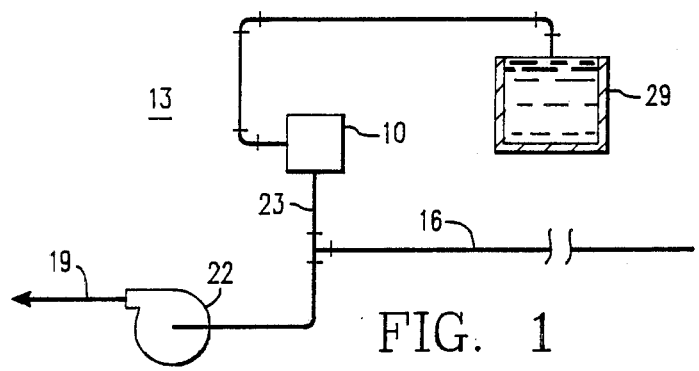
FIG. 1 is a schematic representation of the device of the present invention incorporated into a piping system of a liquid flow stream.

Referring now to the drawings in detail, FIG. 1 shows the separator and venting apparatus 10 of the present invention operably associated with a piping system 13. The piping system 13 includes an upstream piping leg 16 and a downstream piping leg 19, separated by a pump 22. The apparatus 10 is preferably operably associated with the upstream piping leg 16 by a stand pipe 23 to prevent liquid 25 having entrained gas bubbles 28 therein from entering the pump 22. The separator apparatus 10 prevents damage to the pump 22 that may be caused by entrained gas bubbles 28 by separating such gas or air bubbles and venting it off, such as to a tank 29, while preventing the inadvertent venting of liquid 25 when no significant amount of gas is present within the flow stream.

Power Operated Separator and Vent Valve

Figure 2:
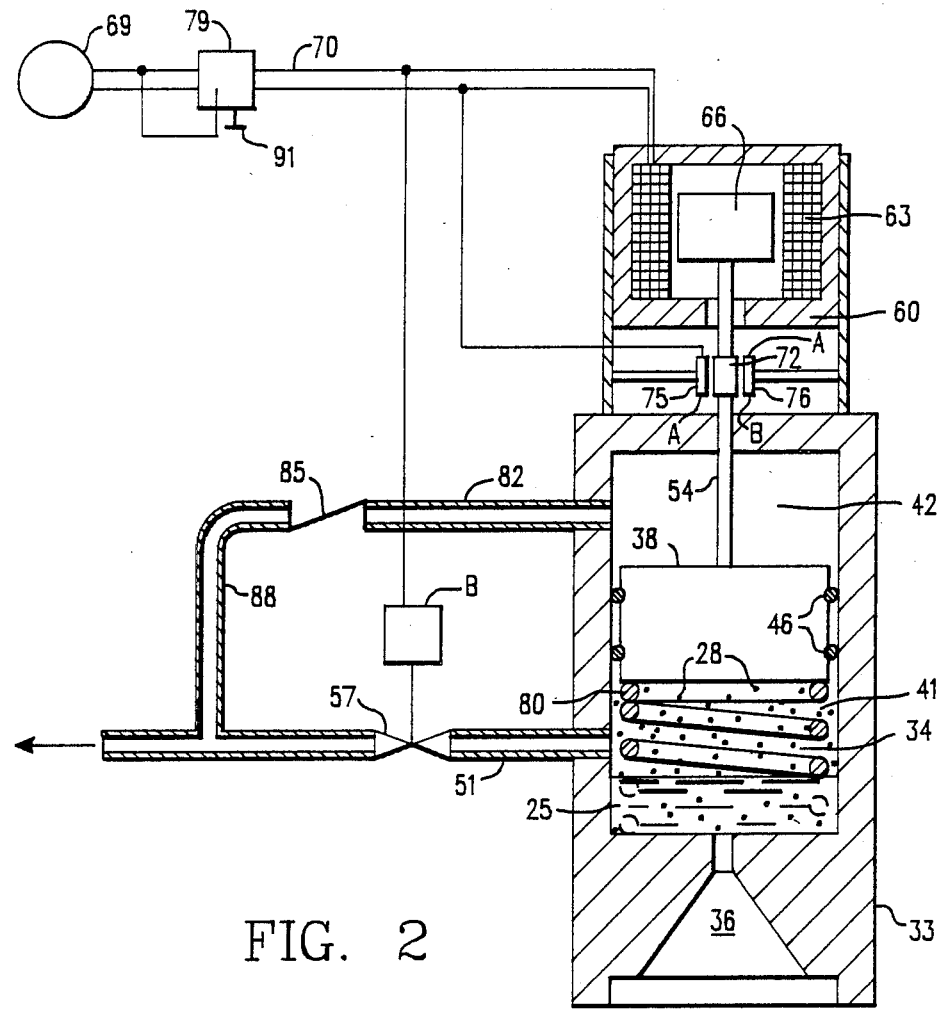
FIG. 2 is a cross-sectional view of one embodiment of the present invention, a power operated separator.

FIG. 2 shows a first embodiment of the separator and venting apparatus 10 of the present invention, a power operated separator 30. The power operated separator 30 comprises a housing 33 defining a separator chamber 34 therein, an inlet 36 for admitting the liquid 25 flow stream into the power operated separator 30; a separator member 38 is movably disposed within the separator chamber 34 to thereby define a first 41 and second 42 chamber therein, as well as means for changing the effective volume of the first chamber 41 for separating any gas or air bubbles 28 from the liquid 25 flow stream, and means for venting off the gas after it has separated from the liquid flow stream. Preferably, the separator member 38 includes a pair of O-rings 46 to prevent gas 28 or liquid 25 within the first chamber 41 from flowing past the separator member 38 and into the second or upper chamber 42. A gas outlet 51 is also in fluid communication with the first chamber 41 for venting any gas 28 that has been separated out from the liquid 25 flow stream. However, the power operated separator 30 has means for venting only gas 28 from the liquid flow stream 25 through the gas outlet 51.

The separator member preferably comprises a piston 38 disposed within the separator chamber 34 of the housing 33, and a piston rod 54 secured thereto on an end adjacent the second chamber 42. The means for venting only gas 28 from the liquid 25 through the gas outlet 51 is comprised of a power operated valve 57 disposed within the gas outlet 51 and operably associated with the piston 38 and piston rod 54 to interrupt the separator valve 30 action under certain operating conditions, which will be more fully described hereinafter.

The piston 38 is translated in a direction towards the inlet 36 by means of a solenoid actuator 60, to thereby reduce the volume of the first chamber 41. If it is desired to have a larger separator 30 so as to displace a larger volume of gas, depending upon the size of the piping system, the actuator may take the form of a pneumatic or hydraulic actuator. However, for this illustration, solenoid actuator 60 includes coils 63 and armature 66 within a solenoid actuator housing 67, the armature 66 being secured to the piston rod 54. The solenoid actuator 60 is operably connected to an electric power source 69 by wires 70. Secured to the piston rod 54 approximately midway between the piston 38 and the solenoid armature 66 is a permanent magnet ring 72, for reasons which will become readily apparent.

Also as part of the solenoid actuator 60, supported by the solenoid housing 67 are connected two proximity switches 75 and 76, preferably reed switches, which are activated by the permanent magnetic ring 72. The proximity switches 75, 76 are diametrically opposed, and both are electrically connected to the power operated valve 57 such that the power operated valve 57 is opened and closed in a controlled manner, in order to control the venting action of the separator 30. The power operated valve 57 is connected to both the power source 69 and the proximity switches 75 and 76. Shown in FIG. 2 for simplicity and clarity, wires A are electrically connected, as well as are wires B. As the piston 38 and piston rod 54 are translated in a direction toward the separator inlet 36, downward in the figure, the first proximity switch 75, which is normally in an open position, is closed in order to activate, or open, the power operated valve 57. After the piston rod 57 has travelled a predetermined distance, sufficient to force any gas 28 within the first chamber 41 out of the gas outlet 51, the permanent magnet ring 72 activates or opens the second proximity switch 76, which is normally in a closed position, to close off the power operated valve 57. In this manner, the power operated separator 30 can be closely controlled in order to vent only gas 28 through the gas outlet 51 and prevent the inadvertent venting of liquid 25 therethrough.

Preferably, the system also includes a time delay relay 79 connected to both the solenoid actuator 60 and the power operated valve 57. If there is little or no gas 28 entrained within the liquid 25 flow stream, and hence the first chamber 41, the fluid will not be compressible by the piston 38. To prevent the forcing of liquid into the gas outlet 51 or around the 0-ring seals 46 on the piston 38, the time delay relay 79 will be activated after a predetermined time period to deactivate the solenoid actuator 60 and/or the power operated valve 57, to interrupt translation of the piston rod 54 and piston 38 and return the piston 38 to its at rest position, towards the top end of the power operated separator 30, by means of a spring 80.

Should any gas 28 inadvertently flow around the O-rings 46 and into the upper chamber 42, a second gas outlet 82 is provided to vent off the gas. The discharge from the second gas outlet 82 is connected by a pipe 88 to the first gas outlet 51. The second outlet 82 includes a check valve 85 which prevents any back flow of gas 28 to the upper chamber 42.

When installed on a typical piping system, the power operated separator 30 operates as follows:

As the liquid flow stream flows towards the pump 22, a gas/liquid mixture enters the separator 30 through the inlet 36. The solenoid actuator 60 is then energized. Because gas 28 is less dense than liquid 25, the gas 28 separates out from the liquid 25 as it is funneled into the first chamber 41 of the chamber 34 through the inlet 36. Since gases are more compressible than liquids, if a significant amount of gas 28 exists in the first chamber 41 it is possible to compress it whereas, if substantially only liquid 25 exists compressing it is virtually impossible. If the system is only liquid 25, the piston rod 54 will not be translated a sufficient distance for the permanent magnet ring 72 to activate reed switch 75 and open the power operated valve 57, and solenoid actuator 60 will remain energized only until the time delay relay 79 disconnects the solenoid actuator 60 from the power source 69. If gas 28 is present within first chamber 41 of the separator chamber 34, the armature 66, and hence the piston rod 54 and piston 38 are translated downward to reduce the volume of the first chamber 41. The inlet 36 is sized such that heavy fluid resistance to any fluid within the inlet 36 prevents it from entering the separator chamber 34 during piston 38 translation. The permanent magnet ring 72 on the piston rod 54 thus causes the first proximity switch 75 to close, it being normally open, which in turn energizes the power operated valve 57 to open and thereby vent off the gas 28 from the first chamber 41 through the gas outlet 51.

As the piston 38 continues to translate to force the gas 28 through the outlet 51, the magnet ring 72 causes the second proximity switch 76 to open, it being normally closed. The opening of the second switch 76 interrupts the electrical power to the power operated valve 57 causing it to close and interrupt the venting process. After a predetermined time period has elapsed, this period dependent upon the size of the piping system 13 as well as the size of the separator chamber 34 and amount of pressure, the time delay relay 79 shuts off the solenoid actuator 60. The spring 80 then gradually returns the piston 38 to its at rest position (that is, near the top of the power operated separator 30 in the figure), to return the first chamber 41 to the larger volume.

A switch 91, preferably a sequenced timing circuit, can be used to turn the power operated separator 30 on at prescribed intervals. Since the separator 30 has the ability to distinguish between the condition where a significant amount of gas 28 is present in the first chamber 41, and when it is mostly incompressible liquid 25, the device can independently provide that only gas 28 is vented through the gas outlet 51 and prevent the inadvertent venting of liquid 28 through the gas outlet 51 by too great a piston pressure. Switch 91 can also be manually activated by an operator when it is determined that sufficient gas or air 28 has entered the separator chamber 34 and needs to be vented from the system.

Self-Actuated Separator and Vent Valve

Figure 3:
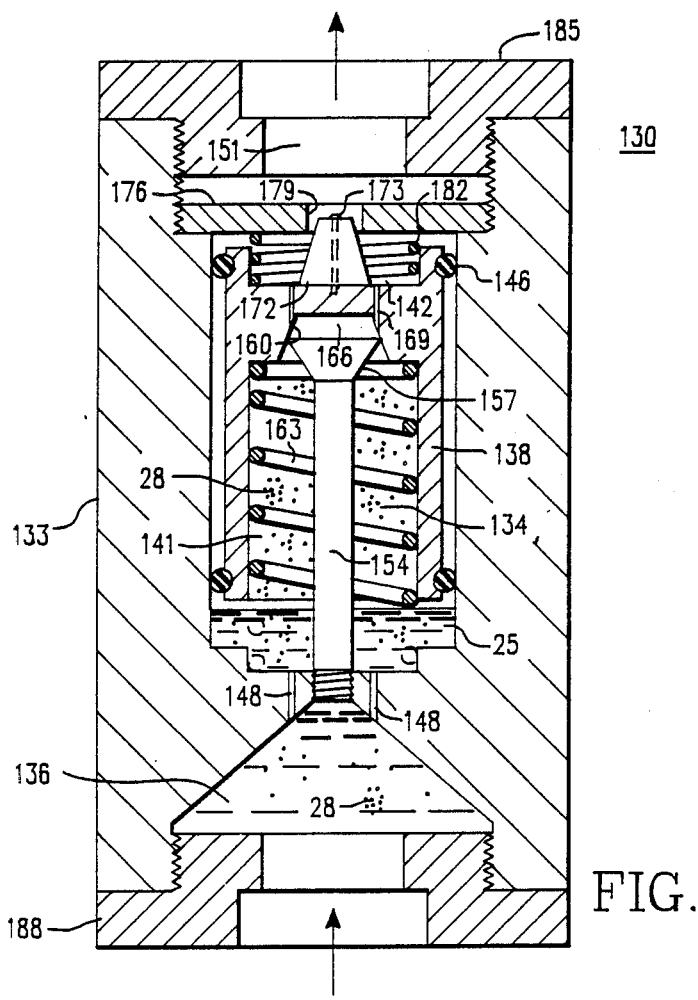
FIG. 3 is a cross-sectional view of a second embodiment of the present invention, a self-actuated separator.

Referring now to FIG. 3, a second embodiment of the separator and venting apparatus 10 of the present invention will be more described in detail; a self-actuated separator 130. Preferably, the self-actuated separator 130 is to be utilized in piping systems of relatively low pressure. The self-actuated separator 130 comprises a housing 133 defining a separator chamber 134 therein, an inlet 136 for admitting the liquid 25 flow stream into the self-actuated separator 130; a separator member or dynamic plug 138 as a means for changing the volume of the separator chamber 134 defines a first 141 and second 142 chamber within the housing 133 for separating any gas or air bubbles 28 from the liquid flow stream, and means for venting off only the gas after it has separated from the liquid flow stream. Preferably, the dynamic plug 138 includes a pair of 0-rings 146 to prevent gas 28 or liquid 25 from flowing out of the first chamber 141 and around the separator member 138 into the second or upper chamber 142. The inlet 136 is disposed adjacent the first chamber 141 and is preferably comprised of a plurality of openings 148. Preferably, four such openings 148 are provided at 90° intervals with respect to each other. A gas outlet 151 is also in fluid communication with the separator chamber 134 for venting any gas 28 that has been separated out from the liquid flow stream. However, the self-actuated separator 130 includes means for venting only gas 28 through the gas outlet 151 and prevents the inadvertent venting of liquid 25 therethrough.

Captured rigidly and centrally within the housing 133, and preferably threadingly engaged thereto adjacent the inlet 136, is a stationary plug 154. At its upper end 157, in the figure, the stationary plug 154 has a frustoconical shape adapted to engage a correspondingly inverted frustoconical cavity 160 within dynamic plug 138. A spring 163 biases the dynamic plug 138 in a downward direction such that the inverted frustoconical cavity 160 within dynamic plug 138 is in abutting contact with the frustoconical top 157 of the stationary plug 154, to effectively seal the first chamber 141 from the second chamber 142, for reasons which will become readily apparent herein. Alternatively, the stationary plug 154 can be generally cylindrical along its entire length and have a diameter large enough to provide the seal. This arrangement provides for a third chamber 166 in the area between the dynamic plug 138 and the top 157 of the stationary plug 154.

Providing for fluid communication between the third chamber 166 and the second chamber 142 of the self-actuated separator 130, and thus the first chamber 141 and the second chamber 142, are a plurality of openings 169 within the separator member or dynamic plug 138. On the upper end of the dynamic plug 138 is secured a conical seat 172, such as by a screw 173. This seat 172 together with an upper plate 176 secured within the housing 133, provides a means for separating off the second chamber 142 from the gas outlet 151. The plate 176 includes an opening 179 which cooperates with the conical seat 172 to control the venting of gas 28 into the gas outlet 151 from the second chamber 142. If desired, a second spring 182 can be provided as a means of adjusting forces on the dynamic plug 138 to seat it against the stationary plug 154 to aid in control of the venting process.

The separator housing 133 includes on its upper 185 and lower 188 ends fittings for mating the self-actuated separator 130 to the tank 29 and the standpipe 23, respectively. When installed on the typical piping system, the self-actuated separator 130 operates as follows:

As the liquid flow stream flows towards the pump 22, a gas/liquid mixture enters the self-actuated separator 130 through the openings 148 of the inlet 136. As the gas/liquid mixture flows through the openings 148 into the first chamber 141, the gas 28 is separated out from the liquid 25. Since the gas 28 is lighter than the liquid 25, the gas rises to the top of the first chamber 141. As the gas 28 continues to build up within the separator chamber 134, the dynamic plug 138 becomes more buoyant thus forcing it to lift under increasing pressure. As the dynamic plug 138 lifts, it is moved out of sealing engagement with the top 157 of the stationary plug 154, thus the third chamber 166 is in fluid communication with the first chamber 141. The gas 28 then flows by means of the second openings 169 within the dynamic plug 138 into the second chamber 142. The sizing of the respective openings 148 and 169 can be chosen with respect to each other so as to control the response time of the dynamic plug 138 as it oscillates between positions, up and down with respect to the figure. Because of differential pressure and spring 163 action the dynamic plug 138 is pushed upwards and the conical seat 172 is seated within the opening 179 of the plate 176 thus closing the venting action. Further gas 28 migration settles within the second chamber 142 causing it to accumulate therein and to gradually push the dynamic plug 138 downward or back to its initial position. This unseats the conical seat 172 from the opening 179 allowing the gas 28 to be vented off through the gas outlet 151. The dynamic plug 138 thus cycles between the fixed plug 154 and the opening 179 of the plate 176.

Preferably, the opening 179 in the plate 176 has an area larger than the combined area of the plurality of openings 169 in the dynamic plug 138. Thus, as the pressure of the gas 28 builds up within the upper chamber 142 to force the dynamic plug 138 downward, the gas 28 will flow through the larger opening 179 and into the gas outlet 151 rather than back through the openings 169 within the dynamic plug or separator member 138. Also, the spring 163, together with second spring 182 if included, will help reseat the dynamic plug 138 on the stationary plug 154 in order to control the venting action, and thus prevent too large of a build up of pressure within the separator chamber 134 such that liquid 25 would be vented off through the gas outlet 151. If there is sufficient head (pressure), it may be advantageous to eliminate the springs 163 and 182 all together. In which case, the pressure in the system provides the seating load in order to control the venting action. In addition to the function of controlling the venting action, biasing the dynamic plug 138 downward on the stationary plug 154 prevents any gas 28 trapped within the second chamber 142 from being siphoned back down into the main liquid flow stream as, for example, during pump start up or flow reversal.

As an example of a typical use of the device of the present invention, the separator and venting apparatus 10 could be utilized in the piping system of a nuclear power plant. (See FIG. 4.) In an exemplary pressurized water reactor 212 power plant, coolant, typically borated water, is pumped within a primary piping system or loop 213 at a pressure of about 15.5 MPa (2250 psia), in order to transfer heat generated by fissioning of nuclear fuel within the nuclear reactor 212 to one or more steam generators 217. Most preferably, the power operated separator 30 would be used. A secondary piping loop, generally designated by arrows 214, 215, also flows through the steam generators 217, the feedwater therein, entering at piping leg 214, being converted to steam therein, which exits at leg 215, in heat transfer from the pressurized water in the first loop to the second loop. The coolant is then returned to the reactor vessel 212 to begin the process anew. Located on one of the primary loops 213 is a pressurizer (not shown)

which maintains the reactor coolant at the desired operating pressure. On each of the primary loops 213 is a reactor coolant pump 222 which facilitates circulation of the water through the reactor vessel 212, steam generators 217, and associated piping 213.

A nuclear reactor power plant represents a piping system in which the integrity of the associated equipment is to be vigorously safeguarded. It is important to maintain a sufficient level of coolant within the reactor vessel 212 to remove the heat generated by the fissioning of the nuclear fuel. Hence it is essential that the water circulating within the various piping loops, especially the primary loop 213, be relatively free from any significant amount of gas entrained within the coolant flow stream.

Figure 4:
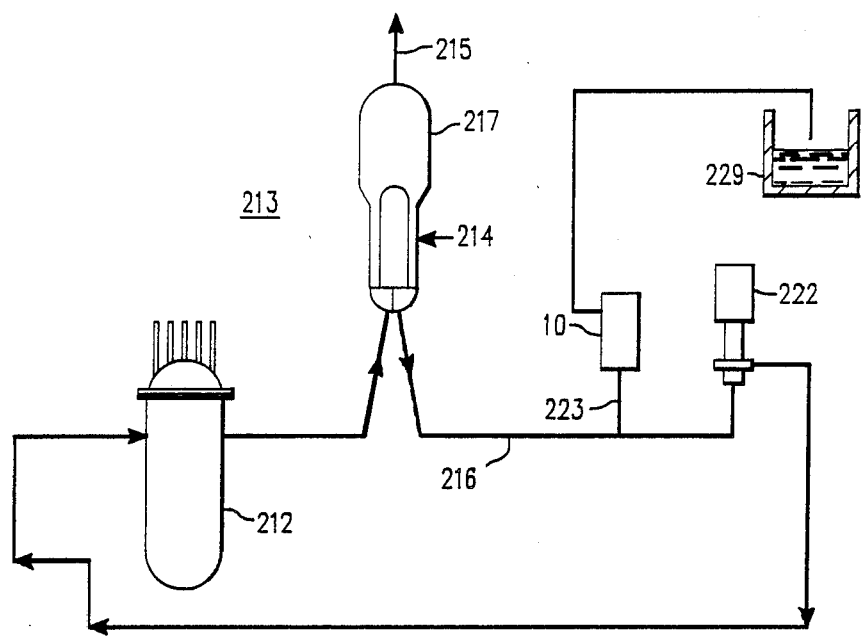
FIG. 4 is a schematic representation of the device of the present invention incorporated into the piping system of a nuclear reactor power plant.

As shown in FIG. 4, the device of the present invention 10 would preferably be connected to the primary piping loop 213 at a location preceding tee inlet line 216 of the reactor coolant pump 222 by piping leg 223. Any gas or air bubbles within the coolant is vented off by the separator 10 and discharged, for example, to tank 229. Additionally, the separator and venting apparatus 10 may also be placed on each secondary loop at a position prior to the feedwater pump (not shown) located on leg 214 to ensure uniform flow of feedwater to the steam generator 217 to provide for the most efficient heat transfer within the system.

While specific embodiments of the invention have been described in detail, it will be appreciated by those skilled in the art that various modifications and alterations would be developed in light of the overall teachings of the disclosure. Accordingly, the particular arrangements disclosed are meant to be illustrative only and not limiting as to the scope of the invention, which is to be given the full breadth of the appended claims and in any and all equivalents thereof.

What is claimed is:

1. Apparatus for separating and venting gas entrained in a liquid flow stream, said apparatus comprising:
   a housing defining a separator chamber therein;
   an inlet for admitting the liquid flow stream into the separator chamber;
   a gas outlet in fluid communication with the separator chamber for venting gas separated from the liquid flow stream;
   means for changing the effective volume of the separator chamber comprising a piston disposed within the separator chamber to thereby define a first and second chamber therein, the first chamber disposed adjacent the inlet and the second chamber adjacent the gas outlet, the piston having a rod secured thereto on an end adjacent the second chamber, and a power operated actuator operably associated with the piston rod for translating the separator member in a direction towards the inlet to reduce the volume of the first chamber; and
   means for venting only gas from the liquid flow stream through the gas outlet.

2. The apparatus as recited in claim 1, wherein said means for venting only gas from the liquid flow stream through the gas outlet comprises a power operated valve having an open and closed position, the power operated valve disposed on the gas outlet, the power operated actuator operably associated with a first switch connected between a power source and the power operated valve such that when the power operated actuator is activated to cause the piston to be translated to reduce the volume of the first chamber and vent said gas, the power operated valve is opened to vent said gas through the gas outlet.

3. The apparatus as recited in claim 1, further comprising a second gas outlet in fluid communication with second chamber and the first gas outlet, the second gas outlet including a check valve to prevent flow of gas from the first gas outlet to the second chamber.

4. The apparatus as recited in claim 2, wherein said means for venting only gas from the liquid flow stream through the gas outlet further comprises a second switch operably associated with the power operated actuator and connected between the power source and the power operated valve such that after the piston has translated a predetermined distance, the power operated valve is closed.

5. The apparatus as recited in claim 4, wherein said means for venting only gas from the liquid flow stream through the gas outlet further comprises a time delay switch operably associated with the power actuated actuator to deactivate the power operated actuator after a predetermined time period, and a spring biasing the piston in a direction away from the inlet, such that the first chamber is returned to its initial volume when the power operated actuator is deactivated.

6. The apparatus as recited in claim 5, wherein the power operated actuator comprises a solenoid actuator having an armature which is secured to the piston rod, and a permanent magnet ring attached to the piston rod between the armature and the piston, and said first and second switches are proximity switches which are activated as said piston rod and permanent magnet ring are translated in the direction towards the inlet to reduce the volume of the first chamber, the first switch being in a normally open position and the second switch being in a normally closed position.

7. The apparatus as recited in claim 6, further comprising a second gas outlet in fluid communication with second chamber and the first gas outlet, the second gas outlet including a check valve to prevent flow of gas from the first gas outlet to the second chamber.

8. In a piping system having an upstream piping leg and a downstream piping leg separated by a pump, and a liquid flow stream being carried by said piping system, a power operated separator for separating and venting only gas entrained in the liquid flow stream, said power operated separator comprising:
   a separator housing having a cavity therein;
   a piston having a piston rod movably disposed within the separator housing and dividing the cavity into a first chamber and a second chamber;
   a separator inlet disposed adjacent the first chamber and in fluid communication with the upstream piping leg for admitting the liquid flow stream into the first chamber of the power operated separator;
   a power operated actuator secured to the piston rod for translating the piston in a direction towards the separator inlet to reduce the effective volume of the first chamber;
   a first gas outlet in fluid communication with the first chamber for venting gas separated from the liquid flow stream;
   a power source for activating the actuator; and means for venting only gas from the liquid flow stream through the first gas outlet.

9. The piping system as recited in claim 8, wherein said means for venting only gas from the liquid flow stream through the first gas outlet of the power operated separator comprises:

a power operated valve having an open and closed position disposed on the first gas outlet;

a first switch operably associated with the piston rod and electrically connected to the power source and the power operated valve such that when the actuator causes the piston rod to be translated to reduce the effective volume of the first chamber to vent said gas, the power operated valve is opened to vent only gas through the first gas outlet;

a second switch operably associated with the piston rod and electrically connected to the power source and the power operated valve such that after the piston has translated a predetermined distance, the power operated valve is closed;

a time delay relay connected between the power source and the power operated actuator to deactivate the power operated actuator after a predetermined time; and a spring connected to the piston for biasing the piston in a direction away from the separator inlet to return the first chamber to its initial volume, after the time delay relay has been activated.

10. The piping system as recited in claim 9, wherein the power operated separator further comprises a second gas outlet in fluid communication with the second chamber at one end and with the first gas outlet at an opposite end, the second gas outlet having a check valve therein to prevent back flow of gas therethrough.

11. The piping system as recited in claim 9, wherein the power operated actuator of the power operated separator comprises a solenoid actuator having an armature connected to the piston rod.

12. The piping system as recited in claim 8, wherein the power operated actuator of the power operated separator comprises an hydraulic cylinder connected to the piston rod.

13. The piping system as recited in claim 9, wherein said first and second switches of the power operated separator are proximity switches, and the piston rod includes a permanent magnet ring thereon for activating said first and second proximity switches as the piston rod is translated in a direction towards the separator inlet.

14. The piping system as recited in claim 13, wherein the power operated separator further comprises a second gas outlet in fluid communication with the second chamber at one end and with the first gas outlet at an opposite end, the second gas outlet having a check valve therein to prevent back flow of gas therethrough.

15. In a nuclear reactor power plant having a reactor vessel, at least one steam generator, a piping loop connected between the reactor vessel and said steam generator wherein a coolant flows from the reactor vessel to said steam generator and back to the reactor coolant pump operably associated with said piping and connected between the reactor vessel and each steam generator, and an apparatus for separating and venting gas entrained in the coolant, said separator and venting apparatus connected to said piping at a location preceding said reactor coolant pump, wherein said gas separator and venting apparatus comprises:

a separator housing having a cavity therein;

a piston having a piston rod movably disposed within the separator housing and dividing the cavity into a first chamber and a second chamber;

a separator inlet disposed adjacent the first chamber and in fluid communication with the upstream piping leg for admitting the liquid flow stream into the first chamber of the separator and venting apparatus;

a first gas outlet in flow communication with the first chamber for venting only gas separated from the liquid flow stream;

a power operated actuator secured to the piston rod for translating the piston in a direction towards the separator inlet and reducing the effective volume of the first chamber for venting said gas through the first gas outlet;

a power source for activating the power operated actuator; and means for venting only gas from the liquid flow stream through the first gas outlet.

16. The nuclear reactor power plant piping system as recited in claim 15, wherein said means for venting only gas from the liquid flow stream through the first gas outlet of the separator and venting apparatus comprises:

a power operated valve having an open and closed position disposed on the first gas outlet;

a first switch operably associated with the piston rod and electrically connected to the power source and the power operated valve such that when the power operated actuator causes the piston rod to be translated to vent said gas, the power operated valve is opened to vent only gas through the first gas outlet;

a second switch operably associated with piston rod and electrically connected to the power source and the power operated valve such that after the piston has translated a predetermined distance, the power operated valve is closed;

a time delay relay electrically connected between the power source and the power operated actuator to deactivate the power operated actuator after a predetermined time; and a spring connected to the piston for biasing the piston in a direction away from the separator inlet, and return the first chamber to its initial volume after the power operated actuator has been deactivated.

17. The nuclear reactor power plant piping system as recited in claim 16, wherein the power operated actuator of said separator and venting apparatus comprises a solenoid actuator having an armature connected to the piston rod.

18. The nuclear reactor power plant piping system as recited in claim 15, wherein the power operated actuator of said separator and venting apparatus comprises an hydraulic cylinder connected to the piston rod.

19. The nuclear reactor power plant system as recited in claim 16, wherein said first and second switches are proximity switches, and the piston rod includes a permanent magnet ring thereon for activating said first and second proximity switches as the piston rod is translated in a direction towards the separator inlet.

20. The nuclear reactor power plant piping system as recited in claim 16, wherein said separator and venting apparatus further comprises a second gas outlet in fluid communication with the second chamber at one end and with the first gas outlet at an opposite end, the second gas outlet having a check valve therein to prevent back flow of gas therethrough.

21. The nuclear reactor power plant piping system as recited in claim 19, wherein said separator and venting apparatus further comprises a second gas outlet in fluid communication with the second chamber at one end and with the first gas outlet at an opposite end, the second gas outlet having a check valve therein to prevent back flow of gas therethrough.

* * * * *